United States Patent [19]

Johnson et al.

[11] Patent Number: 4,644,535

[45] Date of Patent: Feb. 17, 1987

[54] PCM CHANNEL MULTIPLEXER/DEMULTIPLEXER

[75] Inventors: Charles B. Johnson, Dallas; Howard D. Gardener, Grapevine, both of Tex.

[73] Assignee: Data General Corp., Westborough, Mass.

[21] Appl. No.: 604,095

[22] Filed: Apr. 26, 1984
(Under 37 CFR 1.47)

[51] Int. Cl.⁴ .............................................. H04J 3/00
[52] U.S. Cl. ......................................... 370/99; 370/58
[58] Field of Search .................. 370/58, 99, 66, 110.1, 370/112

[56] References Cited

U.S. PATENT DOCUMENTS

| | | | |
|---|---|---|---|
| 4,322,843 | 3/1982 | Beuscher et al. | 370/58 |
| 4,377,859 | 3/1983 | Dunning et al. | 370/58 |
| 4,382,294 | 5/1983 | Beuscher et al. | 370/58 |
| 4,413,337 | 11/1983 | Dauphin et al. | 370/58 |
| 4,484,323 | 11/1984 | Beuscher et al. | 370/58 |
| 4,484,324 | 11/1984 | Orsic | 370/58 |

OTHER PUBLICATIONS

"Planning for Introduction of New Digital Customer Services and Loop Technologies", by Frank M. Banks, CCITT Paris, France 1984.

"An Overview of Digital Subscriber Systems and Technologies", by Yagi et al, CCITT Paris, France 1984.

"The ISDN Challenge", by K. Sorme, CCITT Paris, France 1984.

"ISDN Services and Their Implementation in EWSD System", by Bocker et al, CCITT Paris, France 1984.

Primary Examiner—Douglas W. Olms
Assistant Examiner—Kenneth I. Rokoff
Attorney, Agent, or Firm—Gerald Cechony

[57] ABSTRACT

Apparatus 117 interfaces system multiplexing/demultiplexing (MUX/DMUX) station circuitry 113, which exchanges pulse code modulated (PCM) signal samples of voice, data and control information in an interleaved port group format with a plurality of the system user ports 120 in each of a succession of sample time intervals, with the system time slot interchange (TSI) matrix 110 which switches the PCM voice, data and control signal samples in each sample time interval in groups of common signal type.

6 Claims, 18 Drawing Figures

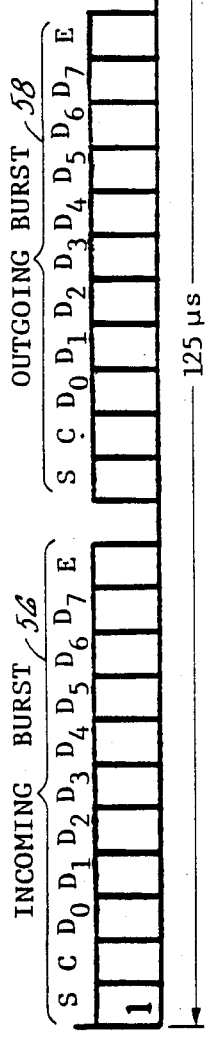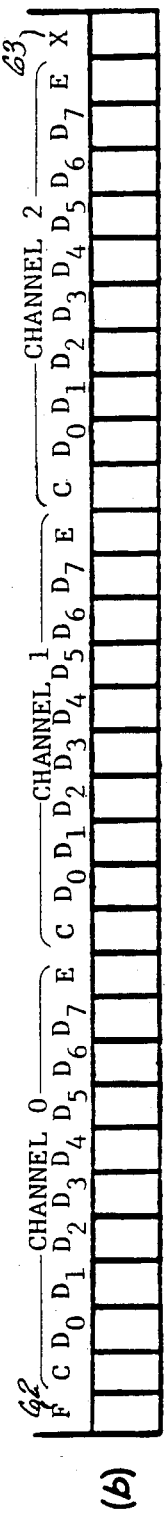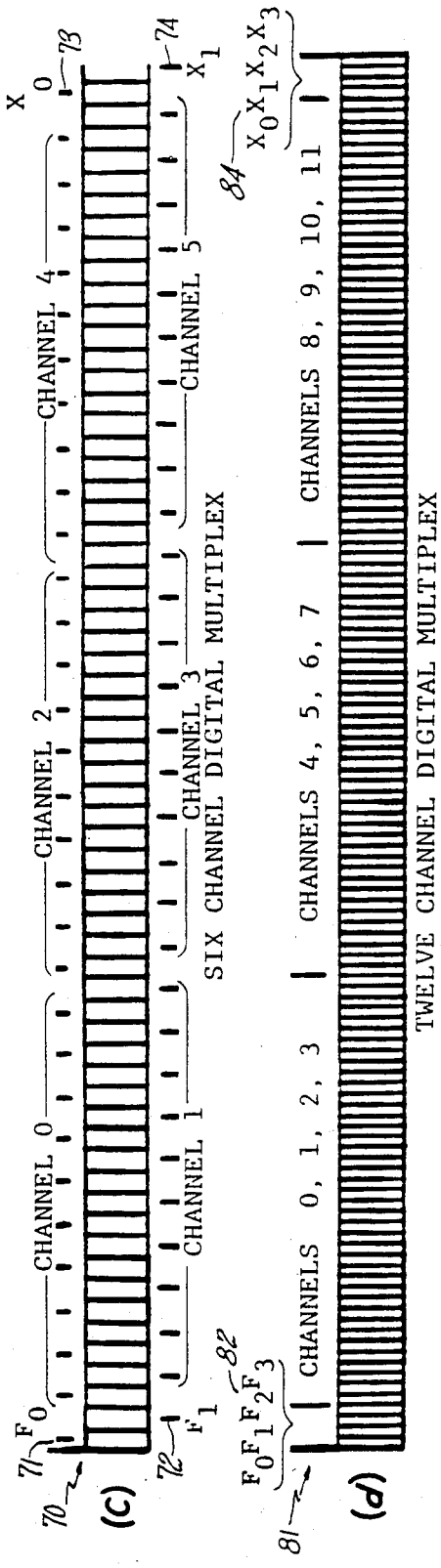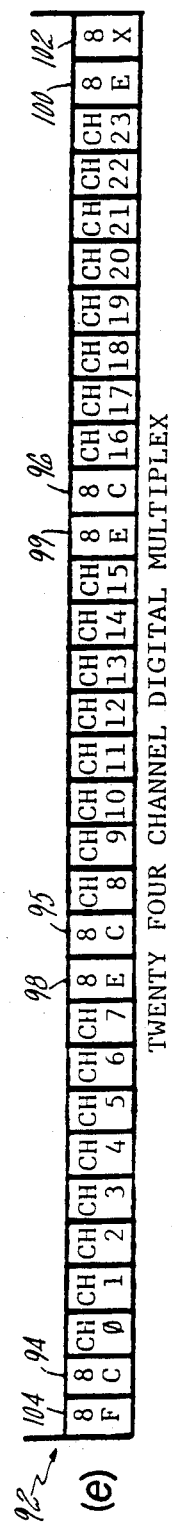
FIG. 4

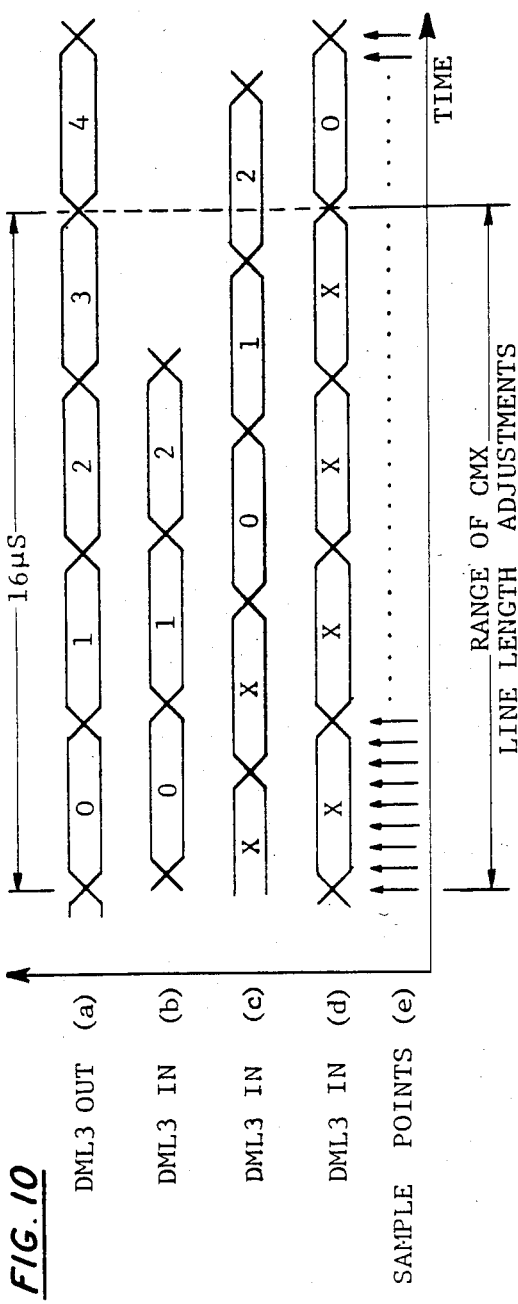

FIG.14

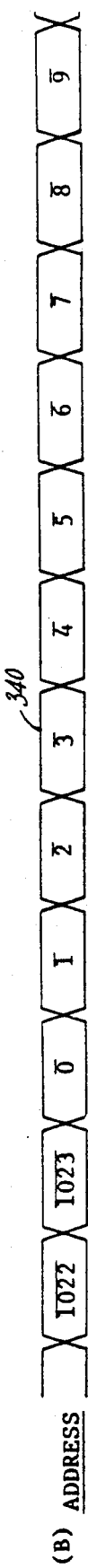
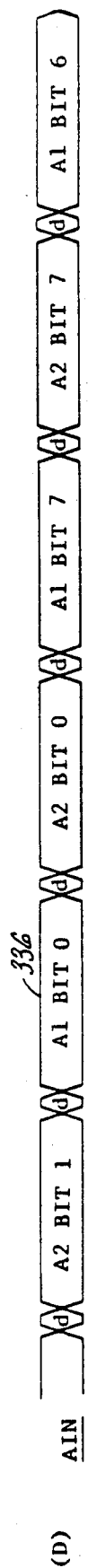
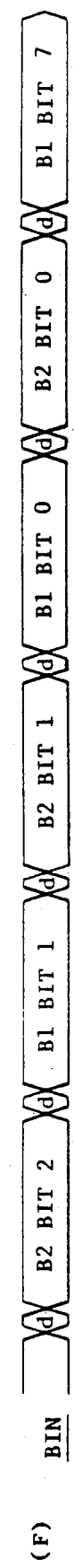
FIG. 16

PCM CHANNEL MULTIPLEXER/DEMULTIPLEXER

DESCRIPTION

1. Technical Field

This invention relates to digital signal multiplexing/demultiplexing (MUX/DMUX), and more particularly to MUX/DMUX in communications systems capable of simultaneous voice, data and control signal transmission.

2. Background Art

The automation of information handling and communications functions stresses the ability to provide full spectrum communications. This is the ability to provide simultaneous voice, data and control information communications throughout a local area network (LAN). One such full spectrum LAN is a time division, pulse code modulated (PCM) digital signal communications system which provides simultaneous voice, data, IDN control, and building control signal information transfer between IDN user signal ports.

This type of LAN is characterized by the fact that: (i) all LAN signal information (e.g. voice, data, IDN control, and building control signals) is interconnected through the system by switch paths through an LAN matrix switch, and (ii) that the switched information is distributed, by signal type, through an LAN transmission system. The transmission system is full duplex, and it exchanges interval samples of each signal type between the user signal ports and the matrix. It does this by multiplexing signal samples from the originating user ports to the matrix and demultiplexing switch samples from the matrix to the destination user ports.

The voice, data, LAN control and building control signal samples received from the user ports are grouped, by common signal type, into multiple bit channel signals. These include multiple bit voice samples grouped into message channels for each port and single bit samples of data, and control information which are grouped in composite channel signals associated with a number of ports. The IDN matrix only switches the information in IDN channel signal groups; the transmission system includes the MUX/DMUX circuitry necessary for assembling the various type port samples for matrix switching, and distributing the switched, return channel signal bits to the proper ports.

DISCLOSURE OF THE INVENTION

The object of the present invention is to provide, in a communications system having a source of control signals, apparatus for interfacing the system's multiplexing/demultiplexing (MUX/DMUX) station circuitry, which exchanges pulse code modulated (PCM) signal samples of voice, data, and control information with a plurality of the system's user ports in an interleaved port group format in each of a succession of sample time intervals, with the system's time slot interchange (TSI) which switches the PCM voice, data, and control signal samples in each interval by groups of common signal type.

According to the present invention, the apparatus includes signal memory, and MUX/DMUX channel circuitry having a first input/output (I/O) interface for exchanging the port interleaved PCM signal samples with the MUX/DMUX station circuitry, a second I/O interface for exchanging the common signal type groups of PCM signal samples with the TSI matrix, and a memory interface responsive to the signal memory, the MUX/DMUX channel circuitry storing the port grouped and common signal type grouped PCM samples received in each sample time interval, in real time, in memory locations associated with the first and second I/O, the channel circuitry retrieving the stored port grouped PCM samples from memory in common signal type groups for presentation to the matrix, and retrieving the common signal type group of PCM samples from memory in port grouped format for presentation to the station circuitry.

In further accord with the present invention, the MUX/DMUX channel circuitry first I/O interface exchanges port grouped PCM sample sets with a plurality of MUX/DMUX station circuitry in each sample time interval and the first I/O associated memory locations include individual address locations for individually storing each port grouped PCM sample set from each MUX/DMUX station circuitry in each sample time interval, each memory address location being identified at the time of PCM sample set storage as the real time of arrival of such sample within the sample time interval combined with individual station circuitry offset times defined by the source of control signals and inversely proportional to the PCM sample set propagation delay associated with the particular MUX/DMUX station circuitry, whereby all stored port grouped PCM sample sets are available for retrieval in groups of common signal type at one predetermined time. In further accord with the present invention, the apparatus includes signal encoding circuitry which encodes a clock signal into each port grouped PCM sample set retrieved from memory for presentation to the station circuitry, the apparatus receiving the clock signal from the source of control signals as representative of the communications system time base, whereby the apparatus provides for clock recovery of the communications system time base by the MUX/DMUX station circuitry.

The apparatus of the present invention provides interface circuitry for reformatting and compressing the PCM samples of voice, data and control information received from a plurality of user ports and received in sets from one or more user port station circuits, into a time division multiplexed signal having the PCM signal samples grouped by common signal type for switching through a TSI matrix. The present apparatus is particularly well suited for use in a communications system of the type disclosed in a copending application of common assignee herewith entitled INTEGRATED DIGITAL NETWORK (IDN) U.S. Ser. No. 604,093 filed on even date herewith by J. C. Bellamy.

These and other objects, features and advantages of the present invention will become more apparent in light of the following detailed description of the best mode embodiment thereof, as illustrated in the accompanying Drawing.

BRIEF DESCRIPTION OF DRAWING

FIG. 4 is an illustration of waveforms used in the description of the illustration of FIG. 3;

FIG. 10 is another set of operating waveforms used in the description of the element of FIG. 7;

FIGS. 11A, 11B are a tabular illustration used in the description of the element of FIG. 7;

FIG. 14 is a waveform illustration used in the description of the system of FIG. 1;

FIG. 16 is a set of operating waveforms used in the description of the component of FIG. 15.

BEST MODE FOR CARRYING OUT THE INVENTION

Figure 2:
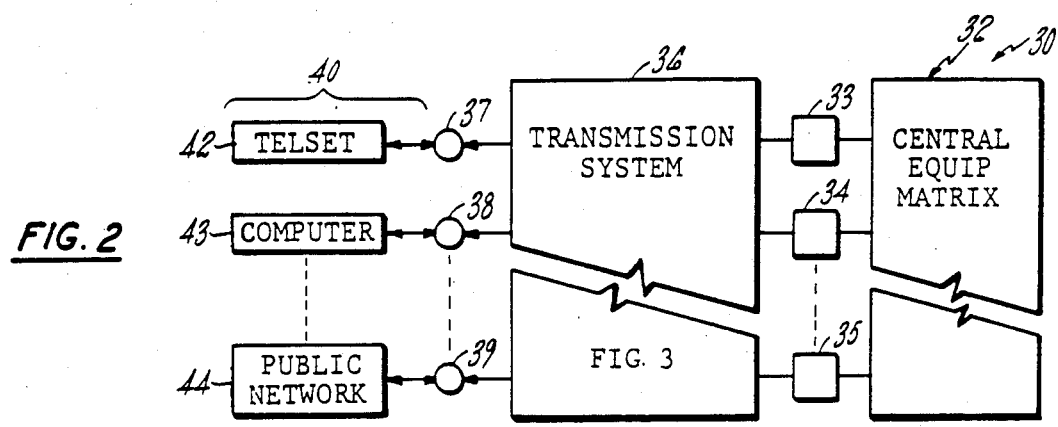
FIG. 2 is a simplified illustration of the embodiment of FIG. 1.

Referring first to FIG. 2, in a simplified illustration of the IDN 30 the major segments include: the central matrix switch equipment 32 with signal Multiplex Ports 33–35, the signal transmission system 36 for transferring signal information from IDN Station Ports 37–39 to the matrix Multiplex Ports, and the attached IDN station equipment 40. The station equipment may alternately include telsets 42 (voice and/or data instruments), computer equipment 43 (computers, computer peripheral equipment, and data terminals), or public network connections 44 (trunk lines to a public central office switch). These various types of data station equipment are connected to the IDN through Data Interface Modules (DIM) which translate the attached device signal format to the IDN station port format. The central equipment matrix 32 interconnects the attached devices at the station ports, and the transmission system 36 provides signal multiplexing of the station port signals for presentation to the multiplex ports of the central matrix.

A fundamental concept of the IDN is the universal transparent digital channel. The IDN station ports are the basic point for connecting voice and data station equipment to the IDN. Each station port is provided with an 88 KBPS signal, distributed as a 64 KBPS message channel (user selectable voice or data), an 8 KBPS auxiliary data signal (for data transmission simultaneous with the 64 KBPS signal), an 8 KBPS signal for IDN control of the port connected station equipment, and an 8 KBPS START bit for clock recovery.

Figure 3:
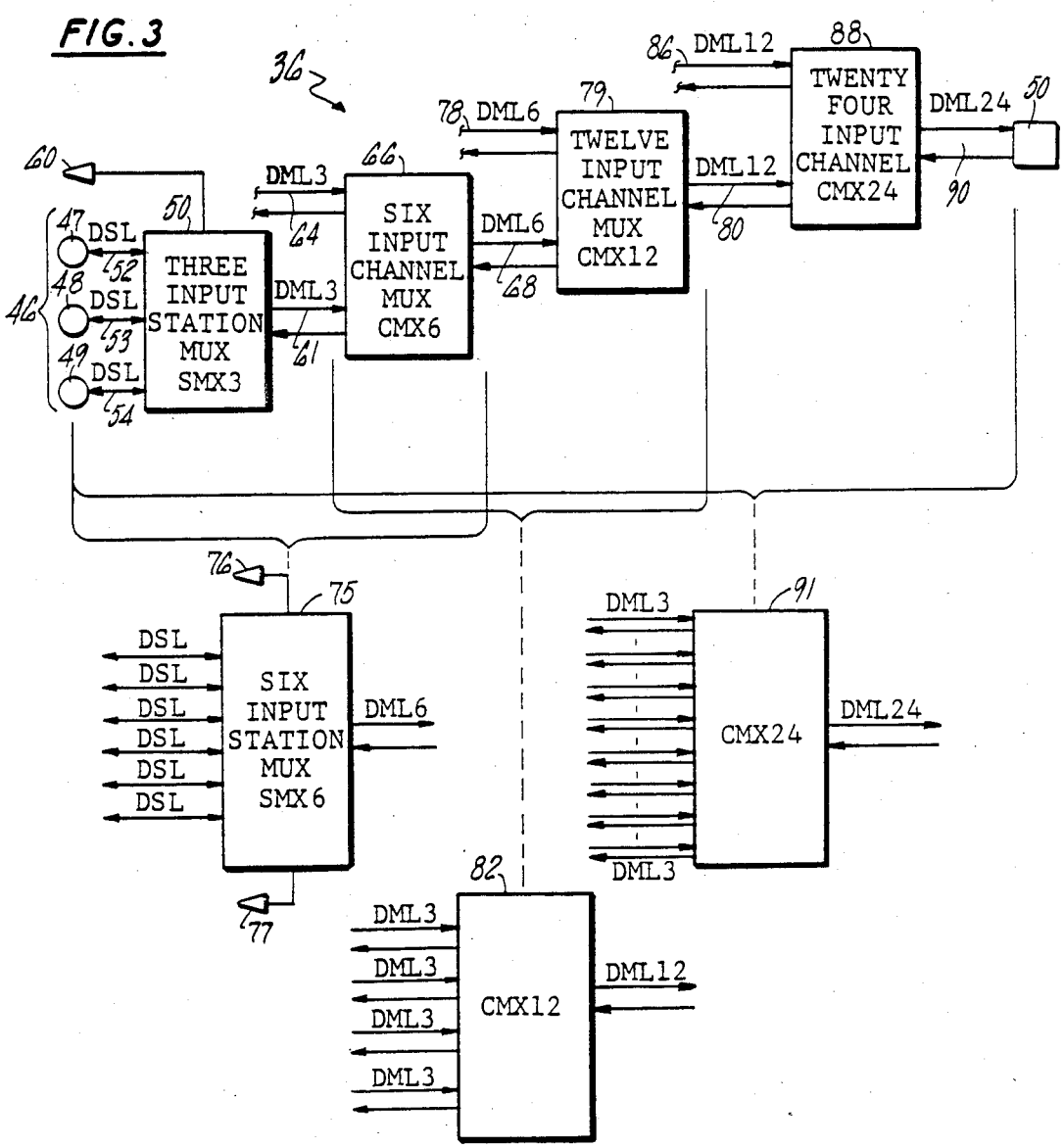
FIG. 3 is a simplified block diagram illustration of alternative system embodiments of the present invention for use in alternative configurations of the system of FIG. 1.

The station ports are serviced in clusters by a Station Multiplexer (SMX). A basic cluster includes three ports, with higher concentrations being available in multiples of the basic cluster FIG. 3, a simplified illustration of the transmission system 36, shows a basic station port cluster 46. Each of the ports (47–49) transmit information to, and receive information from, a three station port Station Multiplexer (SMX3) 50 through an associated Digital Signal Loop (DSL) 52–54. Each DSL comprises two pairs of wires: one pair for digital signal communication with the station port, and one pair for providing electrical power to the port attached station equipment. The DSL is a full duplex loop which provides the 88 KBPS station signal by signal "packet" transmission, i.e. discrete bursts of serial digital signal bits exchanged between the station MUX and the attached station equipment in an 8 KHz ping-pong protocol. Each packet is 11 bits with a START (S) bit, IDN control bit (C), eight voice message bits ($D_0$–$D_7$), and data bit (E). The burst bit rate is 256 KHz. FIG. 4, illustration (a) shows the DSL ping-pong format; the SMX received packet (incoming burst) 56 and the SMX transmitted packet (outgoing burst) 58.

In addition to providing the 88 KBSP signal to each station port each cluster SMX3 provides one 8 KBPS building control (X) signal at a control port 60 (FIG. 3) associated with the SMX. In the IDN architecture the SMX is the basic signal multiplexing level of the IDN transmission system hierarchy and may be remotely located from the matrix. Similarly, the DSL has a permissible maximum line which allows the SMX to be positioned at any distance up to the maximum distance. This allows user choice of location to optimize use of the 8 KBPS building control signal for unrelated controlled devices, such as heating, ventilating and air conditioning (HVAC) equipment. The IDN provides one 8 KBPS control port signal for each three 88 KBPS station port signals; one for each port cluster.

The SMX3 strips the START bits and multiplexes the three 80 KBPS information signals, the 8 KBPS×bit signal, and a clock recovery 8 KBPS FRAME (F) bit into a 256 KBPS bit stream for presentation through a Digital Multiplexed Loop (DML) 61 to an associated higher order Channel Multiplexer (CMX) of the IDN transmission system. The SMX3 demultiplexes an identically formatted 256 KBPS signal from the CMX for presentation to the station and control ports. The DML is a full duplex transmission link with synchronous serial bit transmission in each direction over separate pairs of wires. Since this multiplexed 256 KBPS signal includes three 64 KBPS message bit channels (voice and/or data) the multiplexed signal loop is identified as a DML3.

The DML3 frame format is illustrated in FIG. 4, illustration (b); the 80 KBPS information signals of the station ports 46–48 (FIG. 3) being referred to as channels 0–2. The DML3 frame further including the FRAME (F) bit 62 and control port (X) bit 63. As shown, the station information signals are port interleaved, i.e. the ten information bits of each port are grouped together; each DML3 frame having a total 32 bits in a 125 microsecond frame interval (8 KHz sample frequency) for a 256 KBPS data rate.

The 256 KBPS DML3 signal is multiplexed together with others to provide a higher order (higher bit rate) signal for presentation to the matrix. As described hereinafter in the best mode embodiment of FIG. 1, the IDN multiplex port signals are 2.048 MBPS. This is achieved through alternate CMX configurations. In one configuration shown in FIG. 3 the DML3 61 is multiplexed with a second DML3 signal 64 in a six channel CMX (CMX6) 66 which provides a sum 512 KBPS DML6 signal 68, shown in FIG. 4, illustration (c). The DML6 frame format 70 represents the bit interleaving of two DML3 signals. The FRAME (F) bits of both DML3 signals become a pair of FRAME bits 71, 72 in the DML6 format. These framing bits alternate in unison in consecutive odd numbered 125 microsecond frames. Similarly, the even numbered message channels (0, 2, 4) and odd numbered message channels (1, 3, 5) are bit interleaved, as are the X bits 73, 74. As an alternative, the six channel CMX may be used as a Station Multiplexer, e.g. SMX6 75, which directly multiplexes a group of six DSL station ports into a DML6 signal with two control port signals (control ports 76, 77).

The DML6 signal is multiplexed with a second DML6 signal 78 in a twelve channel CMX (CMX12) 79 to provide a 1.024 MBPS DML12 signal 80, with frame format 81 of FIG. 4, illustration (d). The DML12 signal is shown as two bit interleaved DML6 signals. Alternatively, the CMX12 may provide the DML12 as four bit interleaved DML3 signals (twelve channel MUX 82 with four DML3 signal inputs). The four DML12 framing bits 83 alternate in unison in consecutive odd numbered frames. The DML12 includes four control port X bits 84 (one for each three message channels).

The CMX12 may then be multiplexed with a second DML12 signal 86 in a twenty-four channel CMX (CMX24) to provide the 2.048 MBPS DML24 signal on lines 90 to the multiplex port 50. As in the lower order DML signals the DML24 represents the combining of either two DML12 signals, four DML6 signals, or eight DML3 signals. The eight DML3 alternate is shown by CMX24, 91. The DML24 signal 92, shown in FIG. 4, illustration (e), is the highest bit rate multiplexed signal of the transmission system 36. It is in a byte interleaved format, and includes: twenty-four 8 bit message channels (CH0-CH23), three composite 8 bit control (C) channels 94-96, three composite 8 bit auxiliary data (E) channels 98-100, one composite 8 bit control port (X) channel 102, and one composite 8 bit framing (F) channel 104. A total of thirty-two 64 KBPS channels in each DML24 frame.

Figure 1:
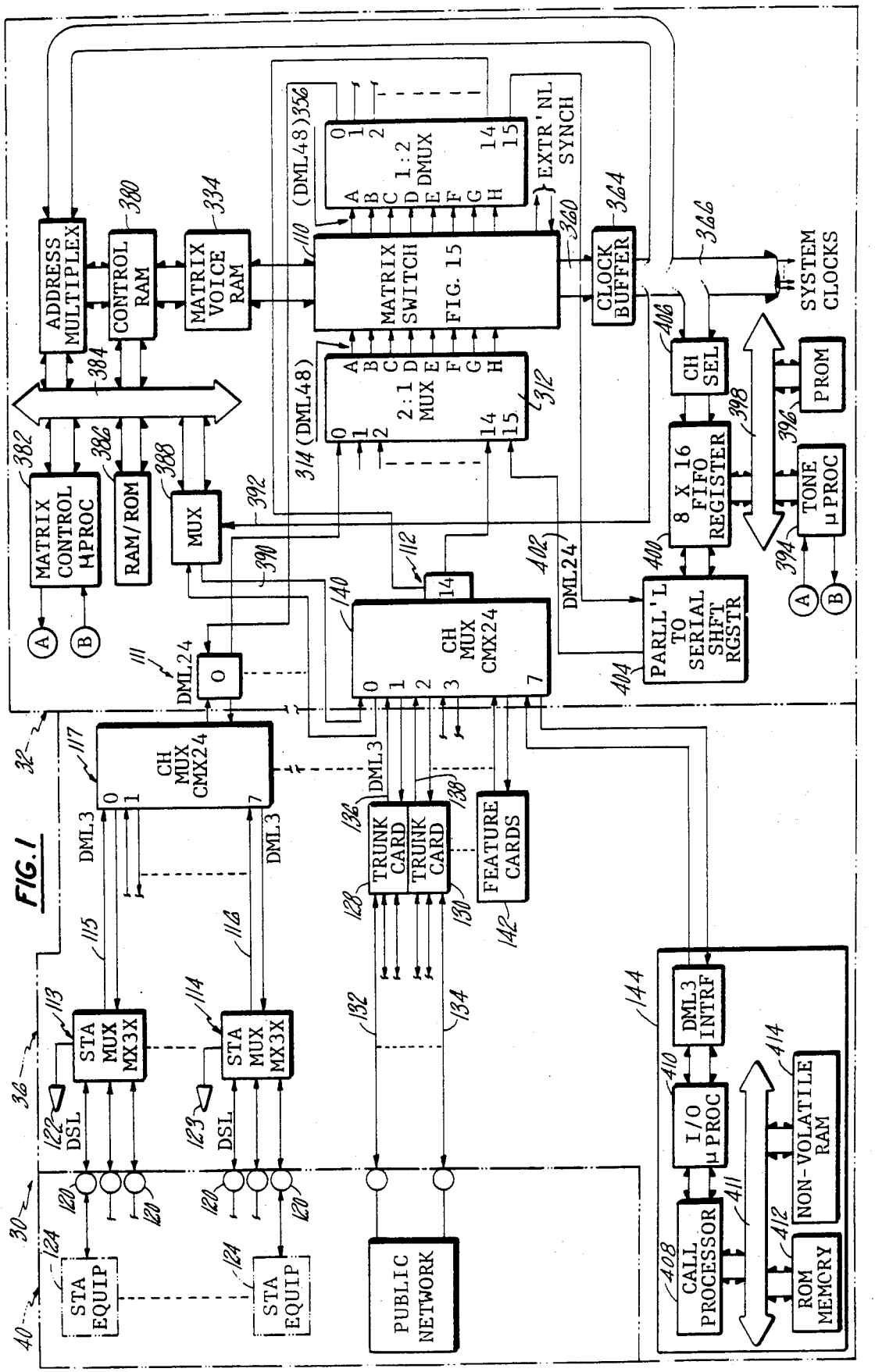
FIG. 1 is a system block diagram of an integrated digital network in which the present invention may be used.

FIG. 1 illustrates a best mode embodiment of the IDN 30 with the central equipment matrix 32, the transmission system 36, and the attached station equipment 40 demarcated by phantom lines to facilitate demonstration of the IDN architecture. In a best mode the central equipment matrix switch 110 (described in detail with respect to FIG. 15) switches 512 64 KBPS channel signals from sixteen DML24 signals at 16 matrix switch signal ports (0–15). FIG. 1 illustrates only two of the switch ports 111, 112. The best mode transmission system 36 is chosen as the basic port cluster, i.e. three channel SMX (113, 114), connected through the DML3 links 115, 116 to a twenty-four channel CMX 117, to provide multiplexing of the station port DSL inputs 120 and control port signals 122, 123 to the switch signal port 111. This combination provides a basic transmission system configuration, allowing for the smallest group concentration of DSL inputs to the Station MUX. However, it should be understood that any one of the combinations of station and channel multiplexers illustrated in FIG. 3 may be used, as necessary, to satisfy user requirements.

Connection of the IDN to the public network is provided through trunk cards 128, 130 which interface the digital signal IDN to conventional telephone trunks of the public network. The trunk cards provide capability of interfacing to Ground Start (GS), Loop Start (LS), Direct Inward Dial (DID), and two wire and four wire E&M trunks. Each of the trunk cards service three of the input trunk lines 132, 134 and convert the line input to the IDN digital format. The trunk digital signal inputs are then multiplexed into a DML3 format and exchanged through DML3 lines 136, 138 with a twenty-four channel MUX (CMX24) 140 which multiplexes them into a DML24 stream to multiplex port 112, together with other inputs to the MX24 from IDN feature cards 142 and the IDN call processor card 144, described hereinafter.

Figure 5:
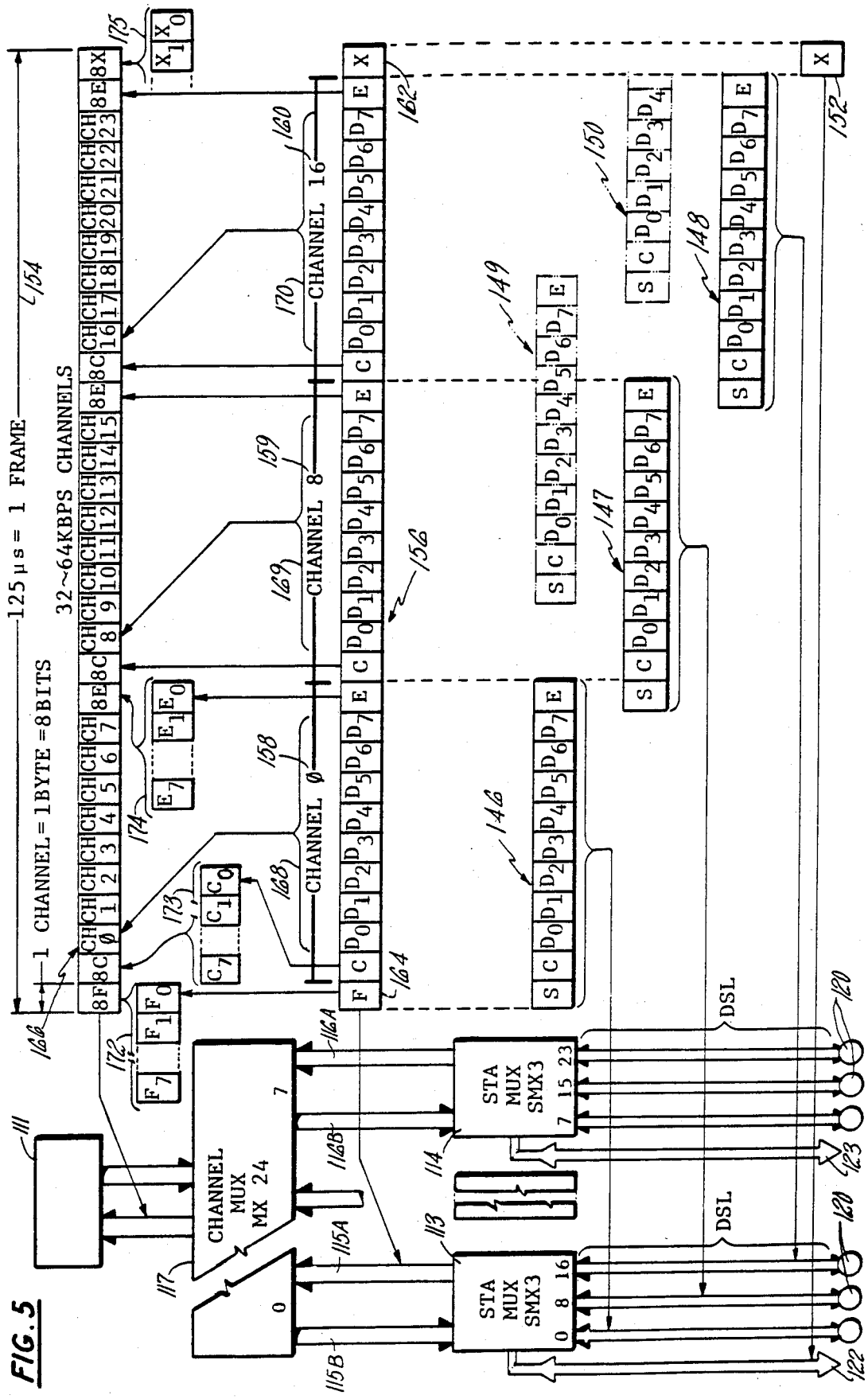
FIG. 5 is a simplified illustration of one embodiment of the present invention, with associated input/output waveforms, for use in the FIG. 1 communications system.

FIG. 5 illustrates the DSL, DML signal formatting through the transmission interface from station ports 120 to multiplex port 111, of FIG. 1. The DSL signals received at channels 0, 8, 16 of the SMX3, 113 are illustrated by station port packets 146-148; the outgoing signals to the station ports are shown in phantom (packets 149-150 for channels 0, 8). The control port X bit 152 is also shown. Each message channel packet includes a start bit plus ten bits of voice, data, and control information. In the DSL transmission protocol the start bit is used by the SMX3 (and the port station equipment) for clock recovery of data packet reception. Each of the packets are exchanged (outgoing/incoming) within each 125 microsecond minor frame 154. In the best mode embodiment the DSL line length is limited to a selected maximum to eliminate signal propagation delay between the station port and SMX3; typically 400 feet.

The SMX3 signals are transmitted to, and received from, the CMX24 through lines 115A, 115B. The DML3 signal 156 is port interleaved; including DSL port channels 0, 8, 16 (158–160), the building control X bit 162 and the FRAME bit 164 for a total of 32 bits. The Channel Multiplexer (CMX) 117 multiplexes eight DML3 signals into the DML24 signal 166 having a 2.048 MBPS bit rate. The DML24 is byte interleaved. Message channel bytes (the selectable voice and data bits $D_0-D_7$ of each DSL channel, 168-170) are interleaved with a composite FRAME byte 172, three composite control bytes (e.g. 173), three composite auxiliary data bytes (e.g. 174) and one composite X byte 175. This is a total of 32 64 KBPS signal channels, 24 of which are message- channels.

The SMX3 to CMX DML3 signal is encoded in digital biphase Alternate Mark Inverted (AMI) signal format. The AMI digital signal is superimposed on a DC power supply voltage signal (VB) provided from the CMX. The CMX to SMX DML3 signal is encoded in a Code Mark Inverted (CMI) format instead of the AMI code. This provides a strong DML clock signal code to allow the SMX3 recovery of the CMX clock.

Figure 6:
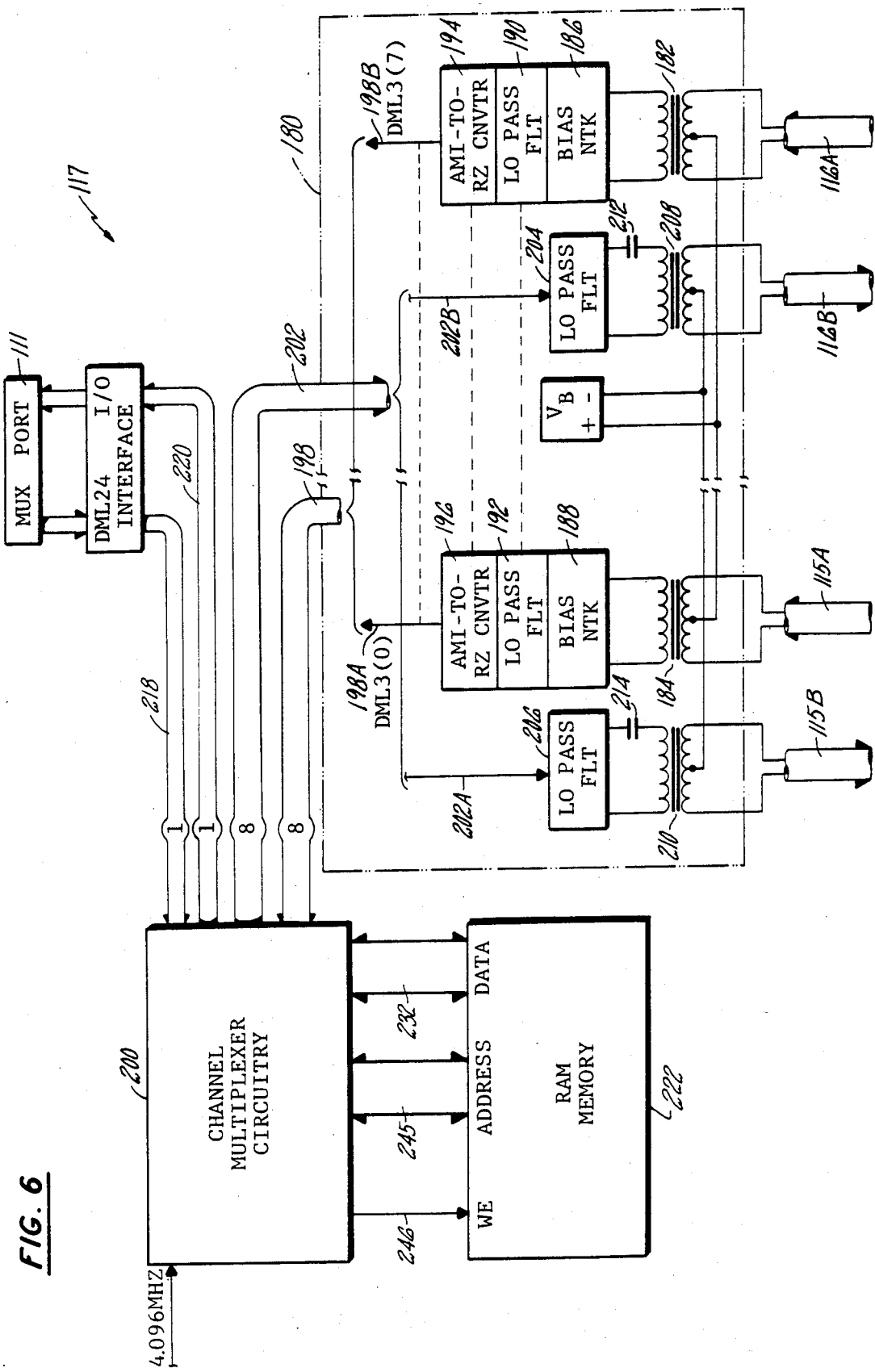
FIG. 6 is a detailed system block daigram of the FIG. 5 embodiment of the present invention.

FIG. 6 is a block diagram of the CMX117. A DML3 input/output interface 180 receives the eight DML3 input and output signals (lines 115A, 116A, 115B, 116B). The input DML3 signals are AC coupled through input pulse transformers 182, 184 which provide a high common mode rejection to block the DC voltages and only allow the DML3 signal to pass through to the transformer secondary.

Biasing resistor networks 186, 188 on each transformer secondary side provide transmission line termination and bias the input signal to the common mode voltage range for the DMX circuitry. The biased DML3 signals are coupled through low pass filters 190, 192 to eliminate high frequency noise and are presented to AMI-to-unipolar converters 194, 196. The converters transform the AMI bipolar signal into a unipolar Return to Zero (RZ) format for multiplexing. The eight RZ DML3 signals are then presented through lines 198 to multiplexer (MUX) 200, an integrated circuit (IC) MUX described in detail with respect to FIG. 7.

The output DML3 signals (to the SMX3) are presented on output lines 202 from the MUX. The output signals are also encoded, but in a Code Mark Inverted (CMI) format. Since the CMI signals contain high frequency components they are filtered through low pass filters 204, 206 having 2.0 MHz cutoff frequencies. This allows the 256 KHz fundamental frequency and three odd harmonics to pass. The filtered signals are presented to output pulse transformers 208, 210. The SMX receives its DC power from the CMX by connecting the center taps of the input pulse transformer primaries and the output pulse transformer secondaries to opposite polarities of a CMX voltage source 211 (typically 28 VDC). A capacitor (typical 0.1 microfarad ) 212, 214 is inserted in each output transformer primary to prevent DC saturation of the transformer. The output transformer secondaries are coupled to the return DML3 transmission line (115A, 115).

The DML24 lines may be coupled through an I/O interface 216, similar to the DML3; depending on the DML24 transmission line length. If the CMX is located within the IDN central equipment the DML24 need not be encoded and transformer coupled, however, long DML24 line lengths are subject to attenuation and signal noise injection from electromagnetic interference (EMI), and it is preferable to encode the DML24 in a differential signal as the DML3. The DML24 signal is provided on lines 218, 220 to the matrix port 111.

Figure 7:
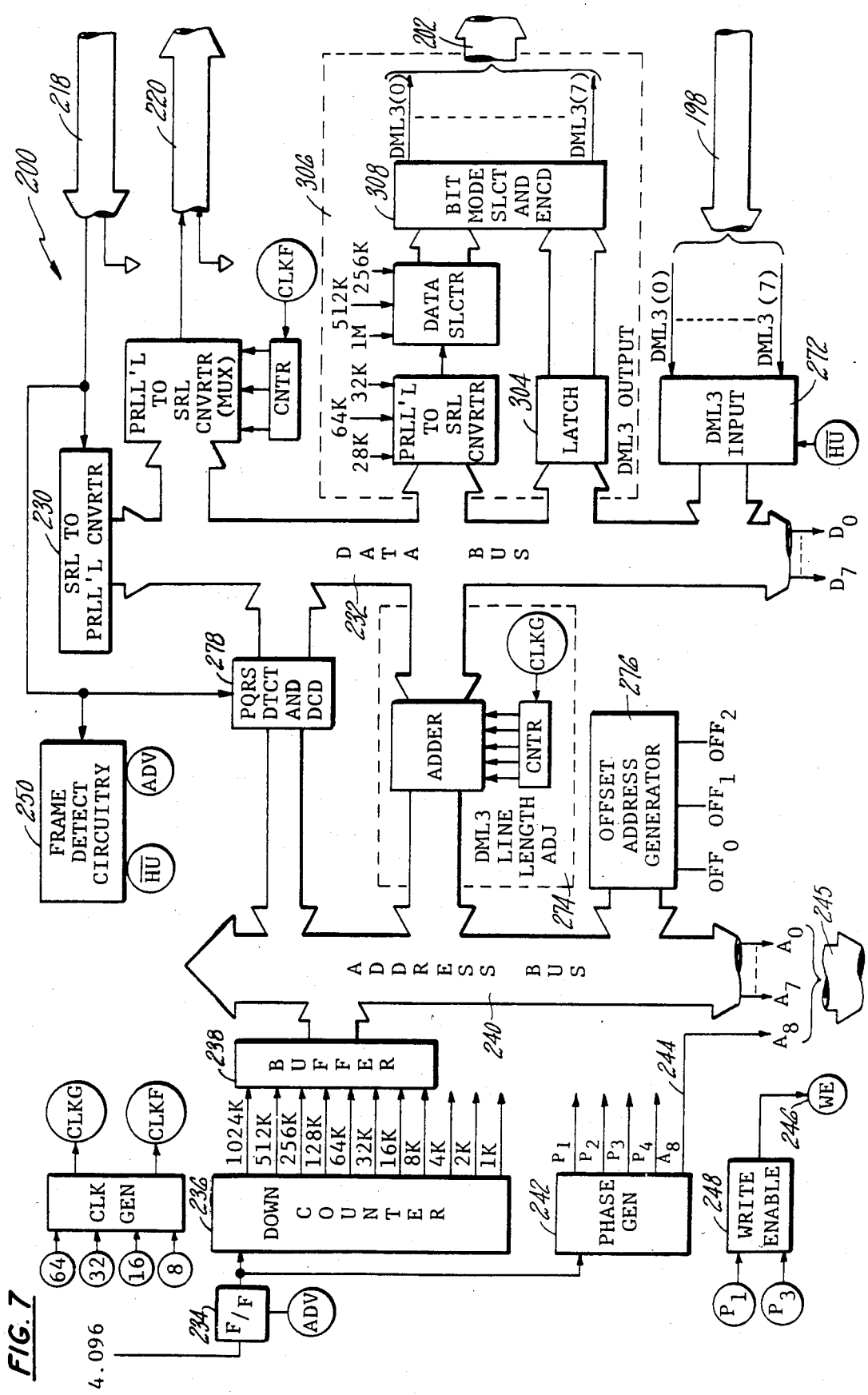
FIG. 7 is a schematic diagram of one element of the invention embodiment of FIG. 6.

The Channel Multiplexer assembly 117 further includes random access memory (RAM) 222 which, in combination with the MUX circuitry 200 provides all of the multiplexing and demultiplexing functions between the DML24 and DML3 lines. FIG. 7 is a system block diagram of the MUX IC architecture. The MUX loads the DML24 input signal from the central matrix on line 218 into a serial-to-parallel shift register 230. The full DML24 frame is loaded, by individual channel bytes, through MUX data bus 232 to the external RAM memory 222 (FIG. 6). The RAM address of each channel byte is generated by an internal MUX counter/address generator which provides a nine bit address to the RAM. This nine bit address is provided through down counting a 4.096 MHz signal from the IDN system clocks (FIG. 1) in bistable device 234 and down counter 236. Eight of the counter clock signals are buffered in register 238 and read in byte format onto the MUX address bus 240 for presentation to the address input of the RAM 222. The ninth address bit is provided by phase generator circuitry 242 which down counts the input 4.096 MHz to provide five clock phase signals (P1–P4, A8). The A8 clock on line 244 is sent with the address bus byte to the RAM to provide the nine bit address. A WRITE ENABLE signal is provided on line 246 to the RAM by timing generating logic 242, to allow write in of each data byte.

The MUX will load the input DML24 data as long as it has achieved framing with the DML24 signal. Framing is acquired when the framing pattern of the composite FRAME byte (172, FIG. 5) over one Master Frame (eight 125 microsecond frames) is in alignment with the internal counters of the MUX frame detect circuitry 250.

Figure 8:
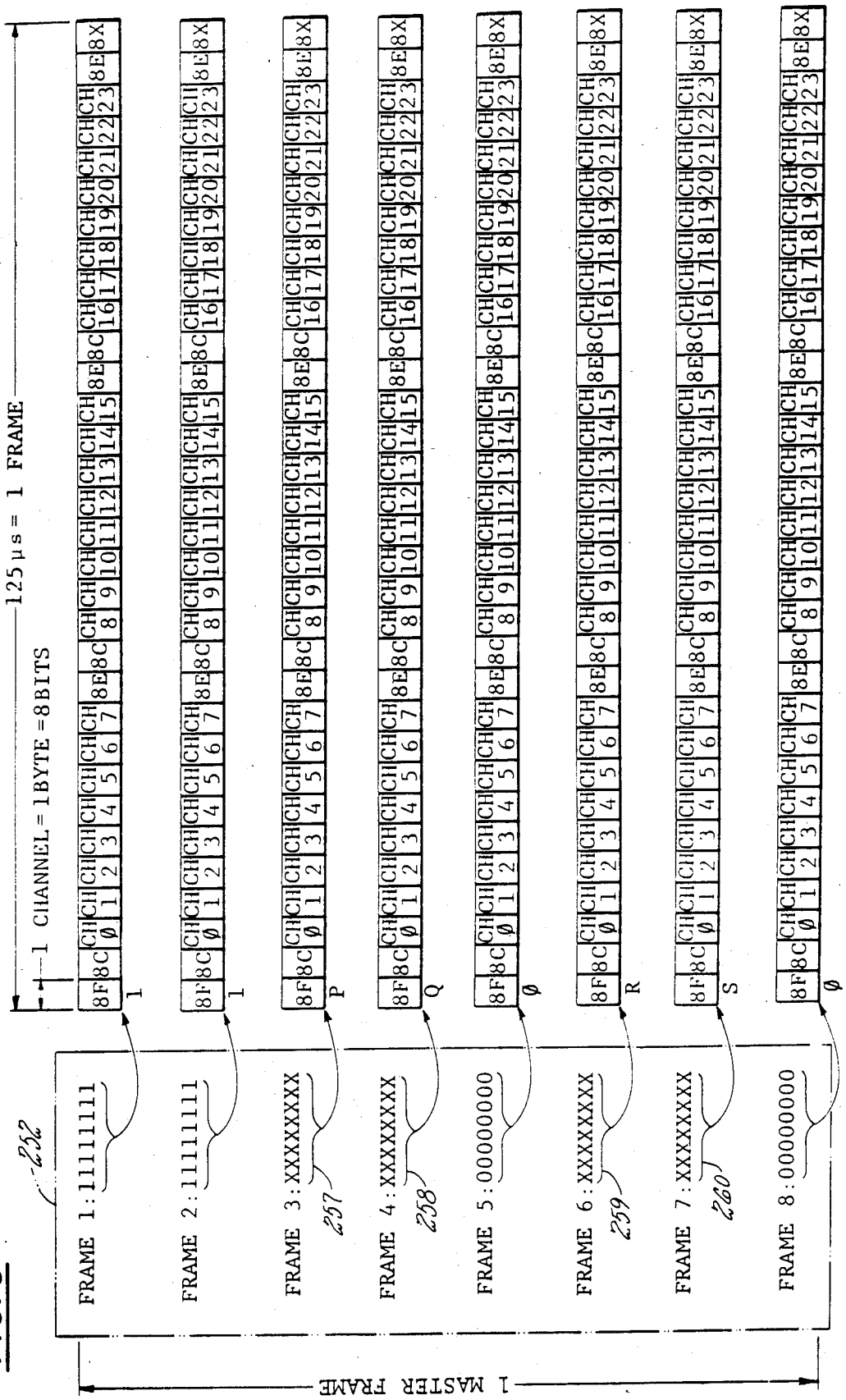
FIG. 8 is an illustration of operating waveforms used in the description of the element of FIG. 7.

FIG. 8 illustrates the framing pattern 252 for eight DML24 frames 254 of one Master Frame 256. The P, Q, R, and S FRAME bytes (257–260) of the Master Frame (minor frames 3, 4, 6, 7) may be in any state and do not affect the framing of the MUX. When the framing pattern has been detected correctly the MUX is in the "hard-lock" state (262, FIG. 9 state diagram) and the MUX provides the multiplexing and demultiplexing of incoming and outgoing DML3 and DML24 data. This is the normal operating state, during which the P, Q, R, S bytes (channels) may be used for MUX operating overhead functions described hereinafter.

Figure 9:
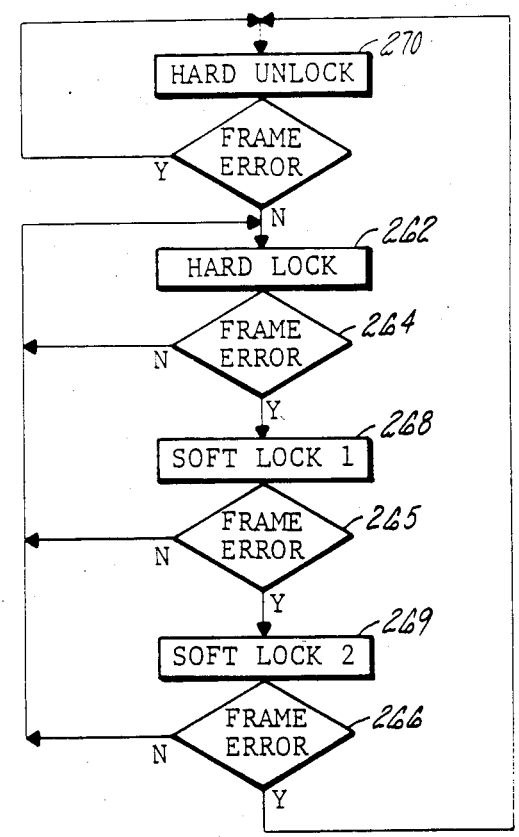
FIG. 9 is a flowchart diagram used in the description of operation of the element of FIG. 7.

If the MUX detects three consecutive incorrect framing patterns (frame errors 264–266, FIG. 9) it will, in the process, leave the hard lock state, pass through "soft lock" states (268, 269) and enter the "hard-unlock" state 270 (FIG. 9). The MUX is in the soft lock state when it detects one, but less than three frame errors, and in this state it functionally operates as in the hard lock state. On the third error the frame circuitry (250, FIG. 7) initiates the hard-unlock state (HU, ADV outputs) causing the CMX to disable DML3, DML24 transmission, holding the DML24 output low and the DML3 output high. It also resets selected CMX functions described hereinafter, including: disabling DML24 loop back (if enabled), no response to P, Q, R, S channel commands and reset all eight DML3 offset locations in RAM (222, FIG. 6) to zero. The CMX immediately attempts to reacquire framing by searching each Master Frame for the pattern. The MUX internal counters (236, FIG. 7) are allowed to "slip" relative to the incoming DML24 data stream; the counters are halted for one half of a DML24 bit (244 nanoseconds) every time a false pattern is detected outside of the hard lock state. A single correct framing pattern places the MUX back into the hard lock state, resuming normal operation.

The CMX also writes the incoming DML3 data on lines 198 into RAM for temporary storage. The DML3 lines are received(DML3(0) thru DML(7)) at the DML3 input interface 272 (FIG. 7). Each DML3 input signal is sampled eight times per bit (2.048 MHz sample rate). Each sample's written in real time is addressed through bus 232 to RAM. Counters 236, 242 provide the nine bit write address (bus 240 and line 244). However, since the individual DML3 loop lengths may vary up to a selected maximum distance, DML3 signal arrival at the CMX may differ due to propagation delays. The 2.048 MHz sample rate provides high resolution for detecting the individual DML3 delays and setting a "line length adjustment" delay value for each.

FIG. 10, illustrations (b), (c), (d) show three input DML3 signals with increasingly higher propagation delays as referenced to the outgoing DML3 signal of illustration (a). Illustration (e) shows the CMX sample rate. A maximum delay of approximately 16 microseconds is added to the real time of arrival of DML3 inputs with line length up to 500 feet; correspondingly less delay for longer lines. The CMX delays formulating the outgoing DML24 message channels for 16 microsecond after the start of the frame; after all DML3 inputs are stored in RAM. The delay ensures that the specific DML3 inputs are available for DML24 insertion when their respective time slots occur.

The amount of delay for each DML3 input signal is determined by an error minimization routine executed by one of the feature cards 142 (FIG. 1) of the IDN. Each DML3 input delay is stored in an "offset" location in RAM; each are five bits, for a total of 32 offset increments at the 2.048 MHz sample for a maximum delay of 32 * 488 nanoseconds=15.6 microseconds. Those DML3 signals with less than 500 foot lines will be stored earlier, i.e. at earlier count address value than the longer line DML3 signals. Therefore, the delay (0–16 microseconds) for each DML3 is read from RAM and added to the sample address by the MUX line length circuitry 274 and address offset generator 276 (FIG. 7) when the DML3 signal is being retrieved from memory for insertion into the DML24 frame.

The eight delay offset values are preset to initial values ranging from 0–3 microseconds during initializing of the CMX and are then altered based on the actual sensed DML3 delay. The values are presented to each CMX by the IDN matrix processor (described hereinafter) through the P,Q,R,S channel bytes (257–260, FIG. 8) of each Master frame. The PQRS are the CMX control channels from the IDN matrix processor. The P channel provides the control data and the Q,R,S, channels together provide the control commands. Under IDN protocol each PQRS byte of each Master Frame is decoded by the MUX P,Q,R,S detect and decode circuitry 278 (FIG. 7) into an equivalent P, Q, R, or S bit. The decode circuitry counts the number of ones in each byte; four or more ones is decoded as a one, five or more zeros is a zero.

The bits are accumulated in a register from eight Master Frames. The single Q,R,S bits form an opcode that is decoded and executed following each Master Frame. FIG. 11A illustrates the Q,R,S bit opcode commands 280; command 011 (282) loading the altered DML3 offset values. FIG. 11B illustrates an accumulated P byte 284; $P_0$ is the most recently decoded P bit and $P_7$ the least recent. The $P_0$–$P_4$ bits represent the five bit offset value ($D_0$–$D_4$) for each DML3 identified by bits $P_5$–$P_7$ ($A_0$–$A_2$). The "load offset" command stores offsets $D_0$–$D_4$ in RAM at locations $A_0$–$A_2$.

The CMX DML3 output signals are formulated by retrieving the DML24 input data stored in RAM as received, in bytes, with byte interleaved message channels ($CH_0$, $CH_1$...) and bit interleaved ($F_0$, $F_1$) FRAME, Control, E bit and X bit composite bytes. For the sake of consistency the eight bits of message information bytes are referred to as message channels and the composite bytes are referred to as composite channels.

Figure 12A:
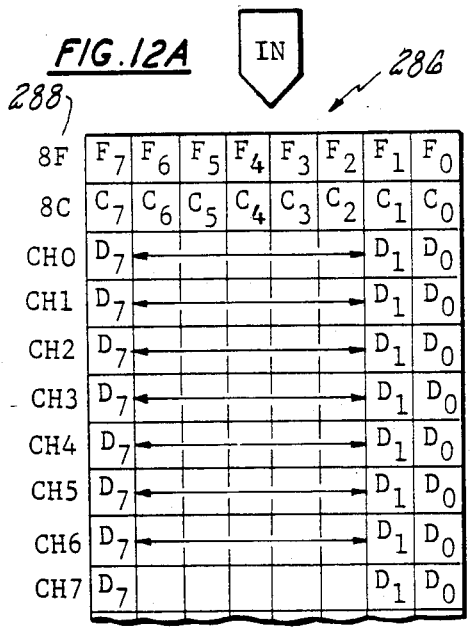
FIGS. 12A, 12B are another tabular illustration used in the description of the element of FIG. 7.
Figure 12B:
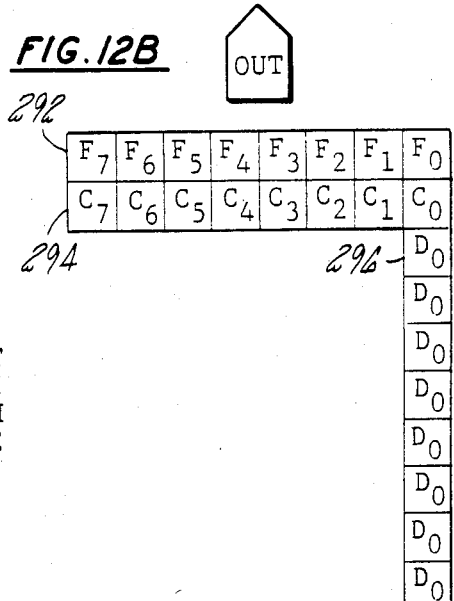
Figure 13:
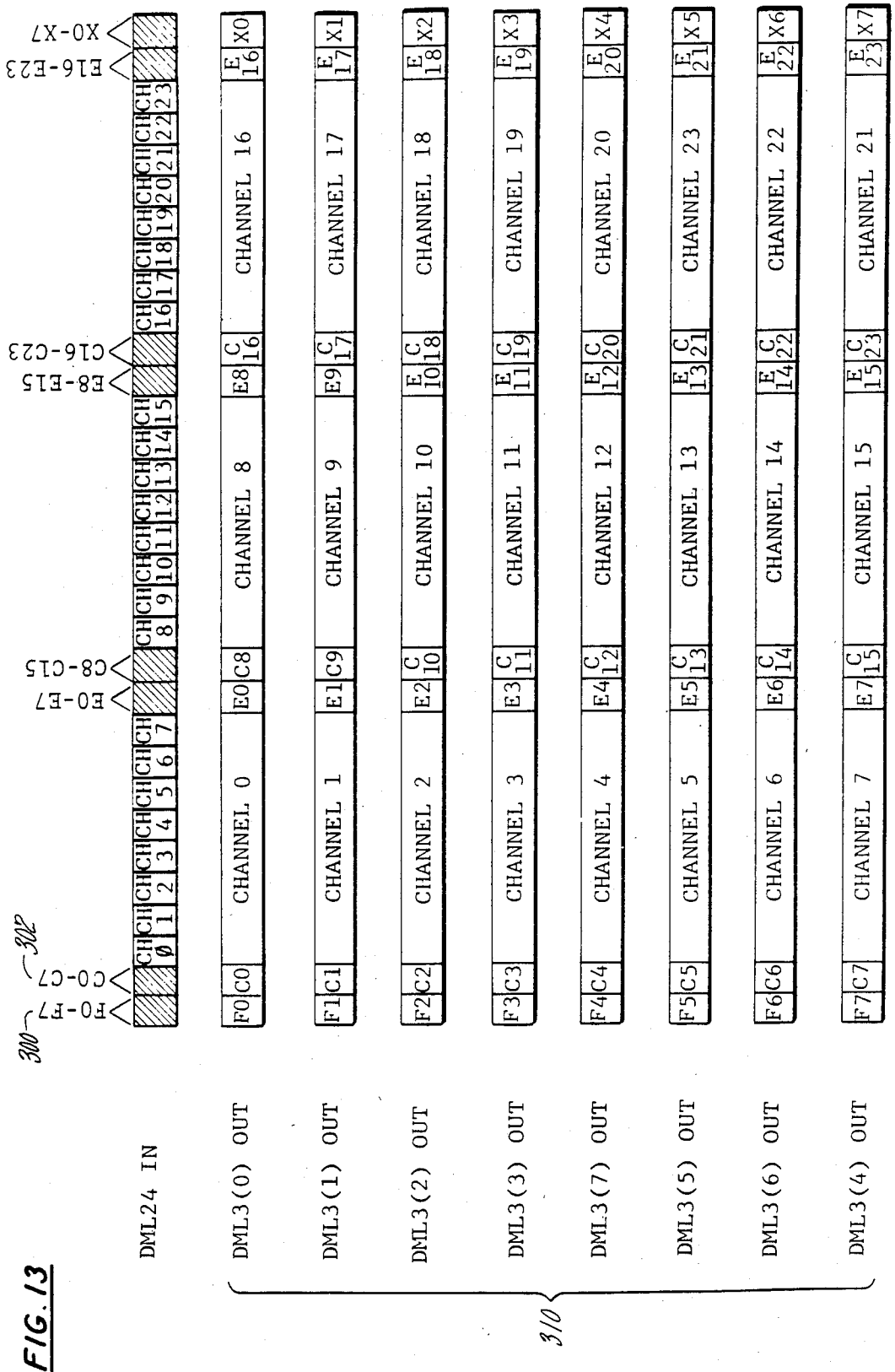
FIG. 13 is yet another set of operating waveforms used in the description of the element of FIG. 7.

FIG. 12A illustrates the RAM stack 286 of the DML24 input including FRAME composite channel 288 through the X byte composite channel 290. The CMX retrieves the composite channels (292, 294, FIG. 12B) in parallel, in one memory access, and demultiplexes the eight bits to each of the eight DML3 outputs. Retrieval of message channel bits require eight accesses (e.g. 296, 298 for bits $D_0$, $D_1$ of CH0). In each access one message channel bit is selected for each DML3 output. The demultiplexing process is illustrated in FIG. 13. The F and C composite channels 300, 302 are loaded in parallel through the CMX data bus to the latch (304, FIG. 7) of the DML3 output interface (306, FIG. 7). The bits are then CMI encoded (308, FIG. 7) and placed on the eight DML3(0)–DML3(7) outputs (310, FIG. 13). The message channel data (e.g. CH0–CH7) is demultiplexed one bit at a time, $D_0$–$D_7$ for each of the DML3 outputs.

Referring again to FIG. 1, the CMX DML24 output signals are presented through input/output (I/O) switch signal ports 111, 112 of the matrix switch equipment 32. In the best mode embodiment there are sixteen DML24 input signals, each including 32 64 KBPS channels (both message and composite channels) in a 125 μS minor sample frame. The DML24 signal frequency is 2.049 MHz. All sixteen DML24 signals are presented to a 2:1 input MUX 312 which multiplexes the sixteen 2.049 MHz DML24 signals into eight, 4.098 MHz DML48 signals (A–H) to the matrix switch 110.

Figure 14:
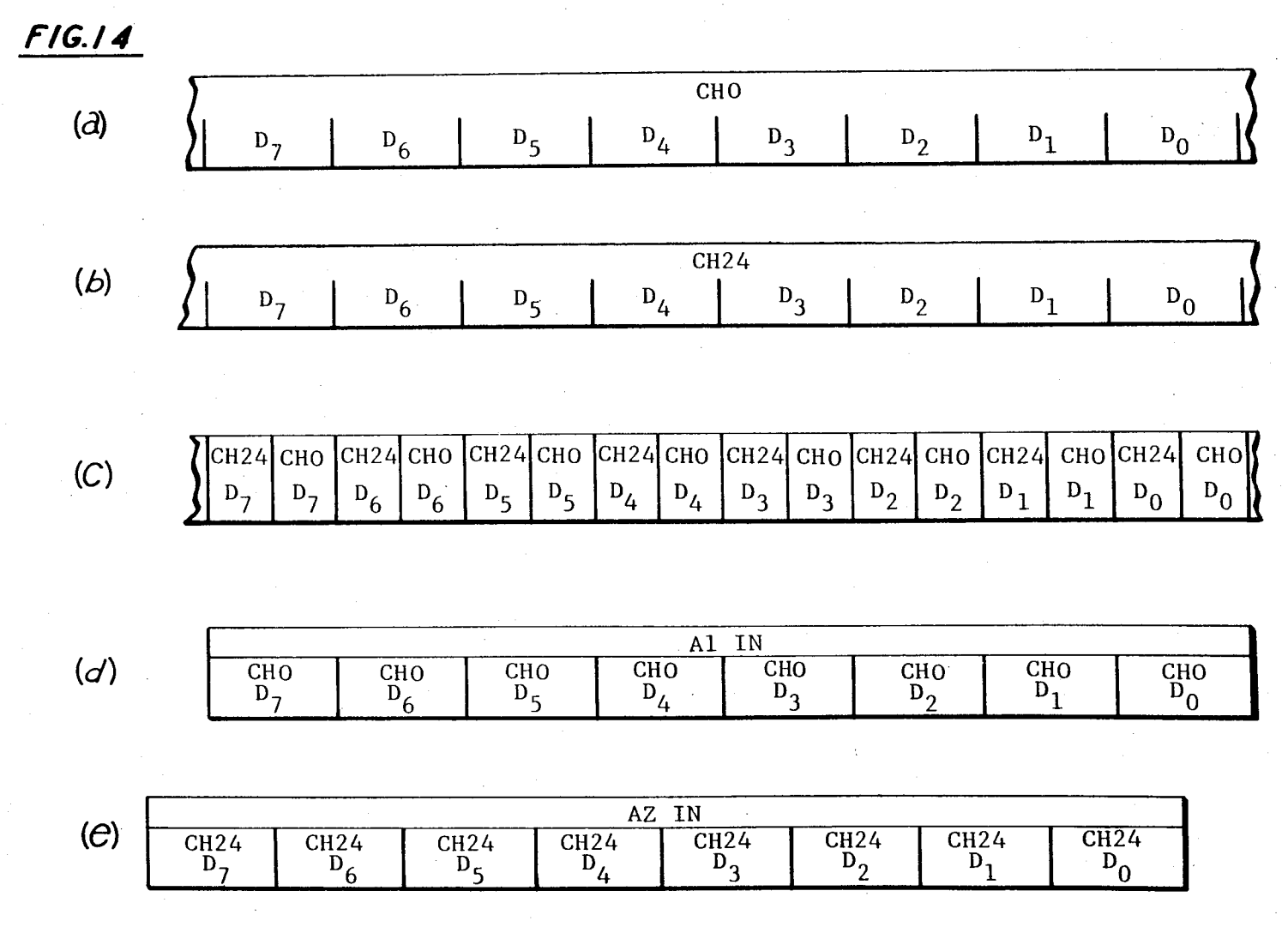
Figure 15:
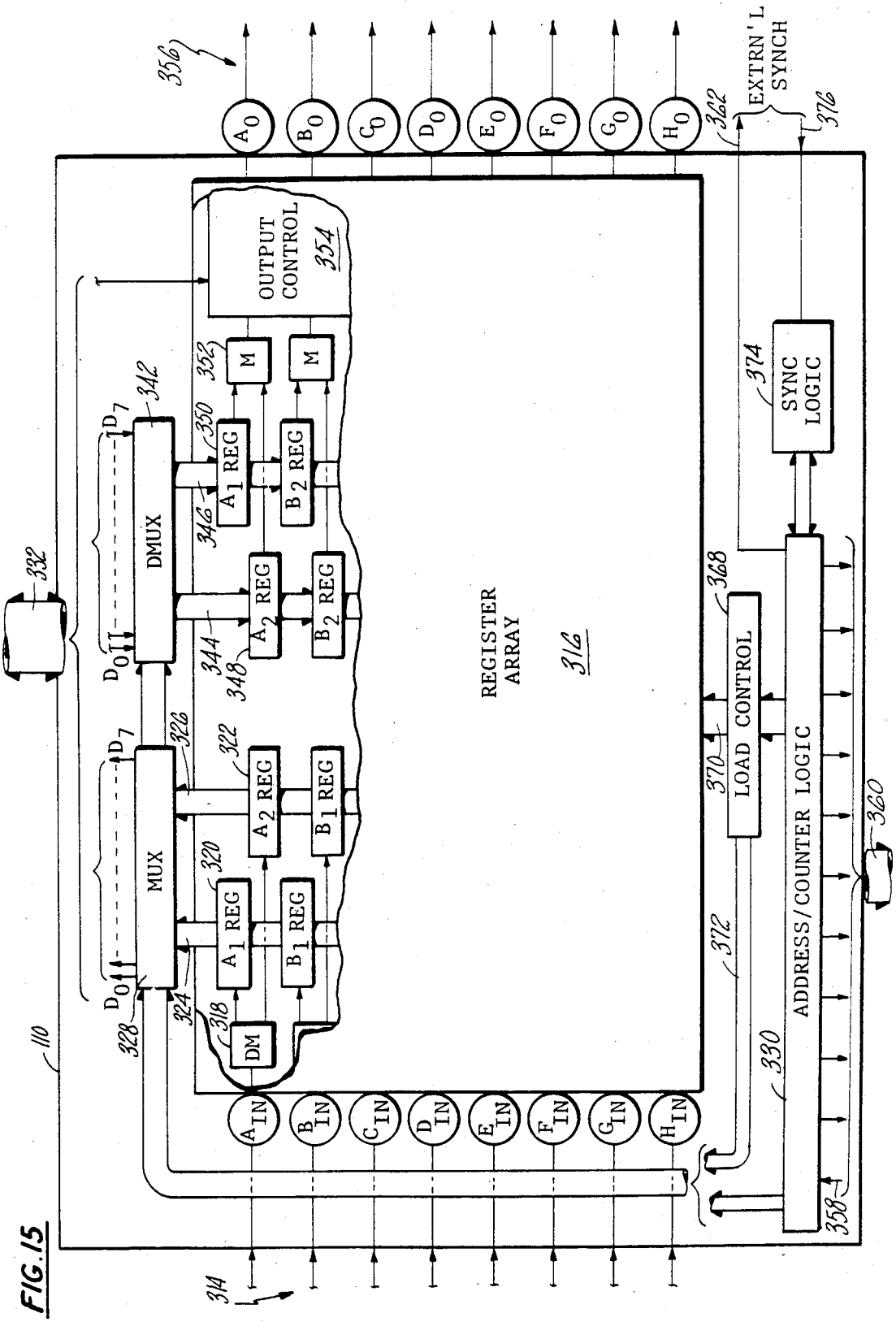
FIG. 15 is a block diagram illustration of still another component of the system of FIG. 1.

FIG. 14, illustrations (a), (b) show two contemporary DML24 message channels at the 0 and 1 inputs to the 2:1 MUX. Illustration (c) shows the resulting D.ML48 multiplexing of the DML24 signal bit interleaved bytes, at twice the bit rate, appearing at MUX output A. FIG. 15 is a block diagram of the matrix switch 110. The eight DML48 inputs 314 (labeled $A_{IN}$–$H_{IN}$) are received by the matrix register array 316. The array separates and buffers the DML48 channel signals in registers associated with each input. As shown for the $A_{IN}$ array input a demultiplexer 318 demultiplexes the bit interleaved DML48 signal into byte channel signals which are serially loaded into serial-to-parallel shift registers 320, 322. The serial loaded bits are strobed out in parallel on buses 324, 326 once per 125 microsecond minor frame, on consecutive clock periods of the matrix master clock, to multiplexer 328. The A–H input channels are strobed in sequence into the voice RAM on successive rising edges of the master clock. The master clock signal is provided by the matrix address/counter logic circuitry 330; the clock frequency being on the order of 4 MHz.

The channel signals from the MUX 328 ($D_0$–$D_7$) are strobed through array output 332 to the matrix voice RAM 334 (FIG. 1). The matrix is a time slot interchange (TSI) type switch. The serial input data at the A–H array inputs is received with the most significant bit (bit 7) received first and the least significant bit (bit 0) received last. FIG. 16, illustrations (d) (f) show a portion of the serial bit interleaved inputs to $A_{IN}$, $B_{IN}$, e.g. $A_1$, $A_2$, $B_1$, $B_2$. Illustration (d) shows a completed $A_1$ channel signal with reception of bit zero 336; the full byte being strobed to the MUX 328 one master clock period later during interval 338 (illustration (c)), with RAM address 340 (illustration (b)).

The returning channel signals from the voice RAM are received by demultiplexer 342 which demultiplexes each eight bits to the appropriate one of two registers. For the $A_0$ output these include parallel-to-serial registers 348–350. The signals are serially strobed through output multiplexer 352, to output control circuitry 354 in bit interleaved DML48 format, and presented to output pins ($A_0$–$H_0$) 356.

The address/counter logic 330 receives an external 4.096 MHz clock signal at pin 358 and synchronously generates the matrix time base signals provided on lines 360. The matrix time base ranges from 4 MHz down to 8 KNz, with a 1 KHz output on line 362 for synchronization with other matrix switches in a larger IDN system. The line 360 clock signals are presented through clock buffer 364 (FIG. 1) and lines 366, throughout the system.

The load control circuitry 368 is synchronized to the clock/address outputs, and decodes the time base required to select proper matrix I/O multiplexing. Matrix sync logic 374 provides an interface for synchronizing other matrix switch time bases and master-frame outputs in larger systems containing multiple matrix switching devices. The sync logic input 376 is a 1 KHz clock from another switch matrix; the same 1 KHz clock signal provided on line 362 of the matrix 110.

Referring again to FIG. 1 the matrix voice RAM 334 provides the actual switching of the byte channel information. The data from the register array is written in and out in the sequence specified by control RAM 380.

A Matrix Control Microcomputer (MCM) 382 loads the control RAM data at system initialization so that output channel numbers match the channel numbers assignment desired, e.g. control channels, framing channels, etc. may be grouped together and assembled in different order than received. The MCM provides an intelligent interface between the IDN call processor card 144 and the matrix switch.

The MCM is a known type microprocessor, such as an Intel 8031 single chip microcomputer, and is interfaced through data/address bus 384 with RAM/ROM memories 386. Address multiplex circuitry 387 decodes the lines 366 system clocks to provide channel identification addresses which are multiplexed with the MCM address lines into the control RAM for proper channel signal identification and channel read/write operation. A feature card multiplexer (FCM) 388 interfaces the MCM to one DML3 loop 390 of channel multiplexer (CMX 24) 140. The DML3 loop isused by the MCM to communicate with the call processor. The remaining seven DML3 loops of the CMX 24 140 are used for communication between the matrix central 32 and the feature and trunk cards described hereinbefore. One important aspect of the present IDN architecture is that all system information, message and composite channel signals, are switched through the matrix switch, thereby allowing the MCM to direct IDN information anywhere in the system. All sources of information are switched. This provides the ultimate in system flexibility.

The FCM includes frame detection circuitry (described hereinbefore with respect to multiplexing circuitry 200 of FIG. 7) and is responsive to time base signals from clock buffer 364 on line 392. The FCM generates interrupt strobes for MCM read/write operation. The three DML3 message channels of each DML3 frame (e.g. 156, FIG. 5) are used for data communication. The control information is provided by the control (c) bit of one of the message channels; one major frame (eight 125 microsecond frames) are required to receive/transmit one byte of control information. The unused bits in each frame are set to a logic zero.

The matrix tone generation circuitry includes a tone generation microcomputer (TGM) 394, a known type such as the INTEL 8031 microprocessor, with external PROM memory 396 and bus 398. The TGM does table loop ups of PCM encoded tones (e.g. dial tones ring back, busy etc.) and writes them into a 16 byte deep FIFO retister 400. The tone information uses sixteen of the abailable thirty-two 64 KBPS channels of a dedicated DML24 loop 402. The remaining sixteen channels are used for IDN control information transfer to the station port devices and to IDN processing equipment, such as the call processor card 144. The TGM generates the control signals for use in frame generation and control channel processing. Both types of information are transmitted to the matrix switch through parallel to serial shift register 404 and the DML24 loop.

The PCM tone data and control information for each set of 16 DML24 channels are loaded into register 400 during each 125 microsecond frame. Synchronization, and the determination of the appropriate channel slot, is provided by channel select circuitry 406 by decoding the system clock signals. The TGM enables the FIFO register to transmit through the DML24 loop, and reports its status to the MCM 382 through two (A, B) parallel output port bits.

The switch matrix distributes all IDN control information by switching the appropriate composite control (C) bit channels to and from the associated processing equipment. The processing of the control information occurs in feature circuits that are integrated into the matrix central equipment. Auxiliary data can be processed by either feature circuits, or by one or more local or remotely attached special purpose processors. All communications within the IDN, e.g. that between user station ports and that within the IDN central equipment, occurs through the switching matrix. As such, the control channel interface which accumulates and disseminates control information from and to station port devices uses the matrix switch to relay this information to and from the IDN call processor on the call processor card 144.

The call processor 408 on call processor card 144 is responsible for setting up and taking down signal connections between the IDN station ports. It also monitors the performance health of the network. The processor, a type known such as the 16 bit Motorola MC 68000 microprocessor, is used in conjunction with an input/output (I/O) microprocessor 410, similarly a known type such as the eight bit INTEL 8051 microcomputer. In addition the call processor card includes onboard RAM and ROM memory 412, 414. The call processor controls all aspects of establishing, maintaining, and terminating all voice/data communications betweenthe IDN station ports. In addition, it runs routine and requested diagnostics, detects failures, and generates statistical reports.

The IDN of the present invention provides simultaneous voice, data, IDN control and building control signal communications to a plurality of user station equipment. The different signal information types are not competitive. They exist jointly; each capable of being transmitted simultaneously or individaully, as desired. The voice signal information commands the highest bit sample rate of 64 KBPS, to accommodate PCM voice fidelity requirements. This corresponds to eight voice message channel signals per second.

All IDN channel signal information, including IDN control and building control signals in addition to voice and data signals, are switched between station signal ports. This means that all channel signals, both message channels and data, IDN control, and building control composite channels, are switched through the matrix. The matrix control processor has the flexibility of switching any information to any IDN port. This allows distributed IDN control processing, such as a remote call processor located on a separate call processor card and communicating with the matrix control processor through the matrix switch. This IDN flexibility permits variable architecture in the sense that some of the IDN control processing may be performed off site.

The building control signal provides for distributed control information to various building environmental equipment. The actual contrcl console for the building equipment may be local to the matrix, or may be located remotely and connected to the matrix through one of the IDN station signal ports. A feature card may be used to provide the building control supervision and data entry from an operator keyboard or console.

By establishing a transmission system hierarchy of multiplexing levels, the IDN permits the greatest versatility in distributing the numbers of station signal ports. The station signal port clusters, ideally three in number, provide an optimum number of ports which may be readily wired through existing telephone interconnect wiring, and placed where needed in an office group. Similarly, a number of station multiplexers combined with one or more intermediate channel multiplexers may be grouped in the same local space and connected through the same type of existing telephone interconnect wiring to the central matrix equipment. This being allowed by, the higher density signal multiplexing (higher bit rate) levels provided by the channel multiplexers; all within the IDN sample time interval.

Similarly, although the present invention has been shown and described with respect to a best mode embodiment, it should be understood by those skilled in the art that various other changes, omissions, and additions in the form and detail thereof, may be made therein, without departing from the spirit and scope of the invention.

That which we claim and desire to secure by Letters Patent is:

1. Apparatus for multiplexing N number of sample frame signals received at a frame bit rate from N number of station devices of a communications system having a source of timing signals, each frame signal including pulse code modulated (PCM) samples of signal port voice, data, and control signal bits in an interleaved port group format, into a time slot interchange (TSI) PCM sample signal with voice, data, and control signal bits grouped in signal bit units of common signal type for presentation to the system TSI matrix at an N times greater frame bit rate, and for demultiplexing return TSI PCM signal samples into port grouped PCM signal samples for return to the station devices, the apparatus comprising:

memory means for storing signals;

station interface means, responsive to the sample frame signals at a station interface input and at a station interface output thereof, said station interface input storing the port grouped voice, data, and control signal bits received from each station device in a station portion of said memory means, said station interface output retrieving, in a first retrieval sequence, common signal type bit units of each return TSI PCM sample signal stored in a TSI portion of said memory to provide the interleaved port group format of voice, data, and control signal bits for return to each station device; and TSI I/O means, responsive to the TSI PCM signal at a TSI interface input and at a TSI interface output, said TSI interface input storing each return TSI PCM sample signal from the TSI matrix in signal bit units of common signal type in said TSI portion of said memory means, said TSI interface output retrieving, in a second retrieval sequence, said interleaved port groups of voice, data, and control signal bits stored in said station portion of said memory to provide the TSI PCM signal bit units of common signal type for presentation to the TSI matrix.

2. The apparatus of claim 1, further comprising:

counter means, responsive to the system source of timing signals for providing a bit sample rate N times greater than the frame bit rate, said station interface input sampling each sample frame signal bit N times to determine the difference in bit time of arrival (TOA) relative to a desired TOA sequence for all sample frame signals, and to provide an offset signal for each frame signal indicative of said difference, said station interface input storing said offset signal in said memory means with the signal bits of each sample frame signal, said TSI interface output retrieving each stored sample frame signal in a time sequence inversely proportional to said offset signal magnitude.

3. The apparatus of claim 1 wherein the sample frame PCM voice samples are eight bits long, the data and control signal samples are each one bit long, and the TSI PCM signal bit units are eight bits long.

4. The apparatus of claim 3, wherein said second retrieval sequence includes retrieval of each of said eight bit sample frame PCM voice samples as one signal bit unit, and wherein retrieval of said one bit sample frame PCM data and control samples further includes the compiling of said data and control samples from every eight signal ports into a signal bit unit.

5. The apparatus of claim 1, further comprising:

counter means, responsive to the system source of timing signals, for providing a station clock signal; and wherein said first retrieval sequence includes the encoding of said station clock signal time base into the interleaved port group format of voice, data, and control signal bits provided by said station interface output for return to each station device, to allow clock recovery of the communications system timing signals at the station devices.

6. The apparatus of claim 5, wherein said encoding is provided in a Code Mark Inverted (CMI) format.

* * * * *